March 7, 1939.　　　　A. A. STARKE　　　　2,149,797

TUBE INFLATING DEVICE

Filed April 1, 1938　　　　3 Sheets-Sheet 1

Anton A. Starke, INVENTOR

BY Victor J. Evans & Co.

ATTORNEYS

March 7, 1939.   A. A. STARKE   2,149,797
TUBE INFLATING DEVICE
Filed April 1, 1938   3 Sheets-Sheet 2
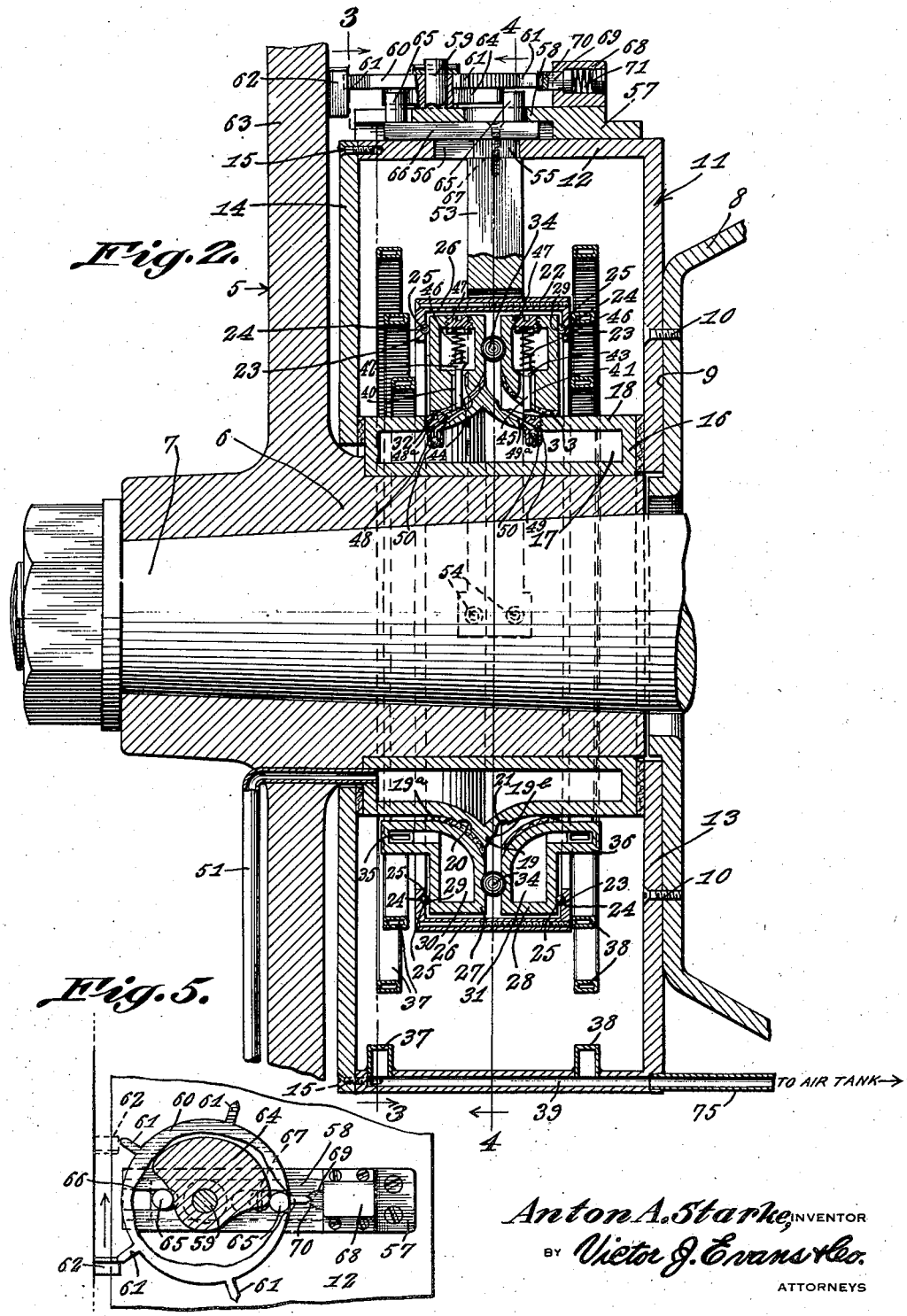
Anton A. Starke, INVENTOR
BY Victor J. Evans & Co.
ATTORNEYS

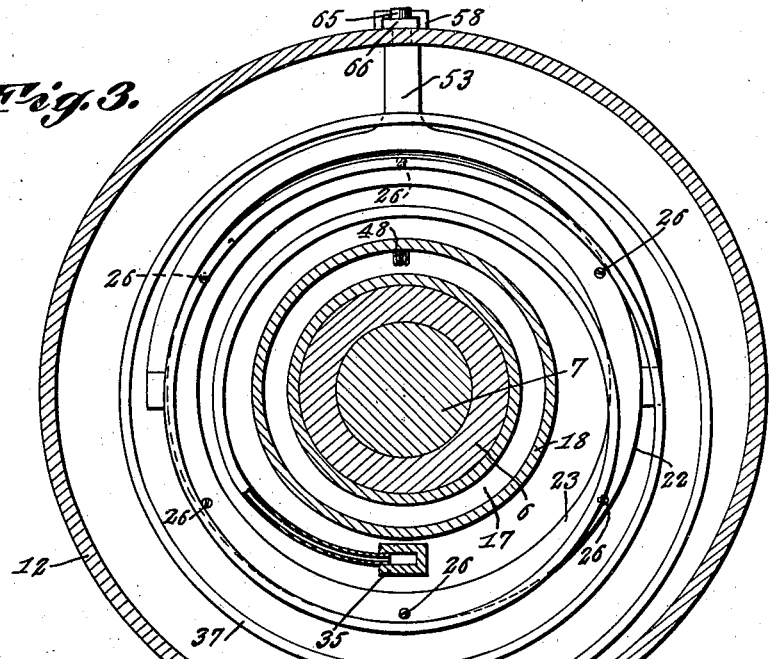
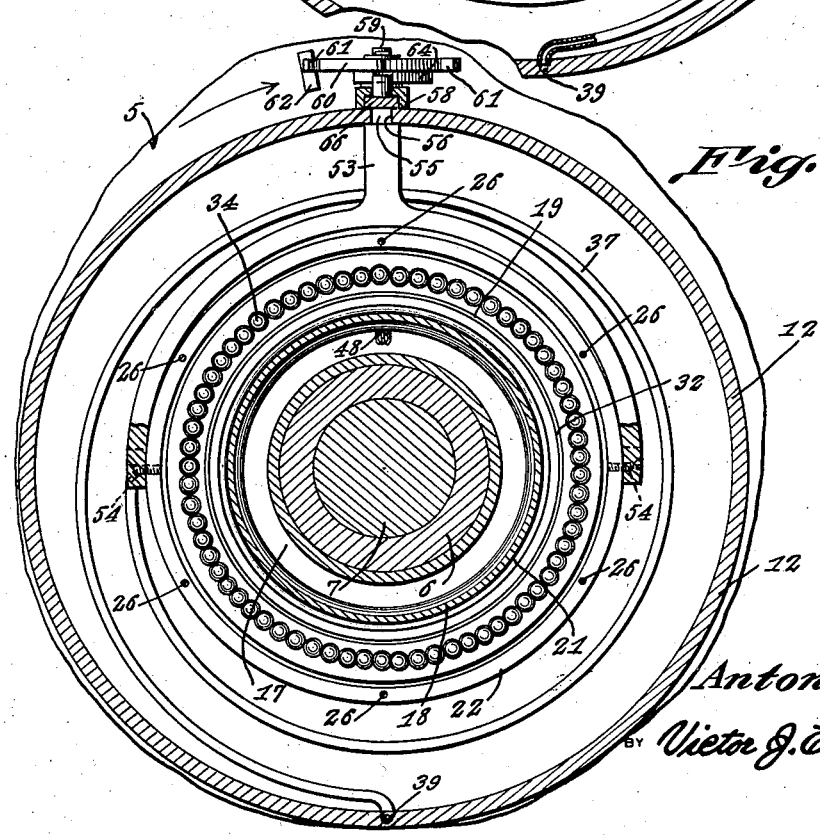

Patented Mar. 7, 1939

2,149,797

UNITED STATES PATENT OFFICE 2,149,797

TUBE INFLATING DEVICE

Anton A. Starke, Reno, Nev., assignor of twenty-five per cent to Gene Casci, twenty per cent to Georgiana Casci, twenty per cent to Elizabeth Starke, and ten per cent to Don Cassettari, all of Reno, Nev.

Application April 1, 1938, Serial No. 199,508

2 Claims. (Cl. 152—416)

My invention relates to inflating devices and more particularly to inflating devices for automatically maintaining a tube in a predetermined inflated condition.

One of the principal objects of my invention is to provide a tube inflating device so constructed and arranged as to be positioned on the wheel of a motor vehicle whereby to inflate and maintain a tube carried by said wheel in a predetermined condition.

Another object of my invention is to provide a device of the above described character operable through the rotation of the motor vehicle wheel to maintain the tube in inflated condition.

A further object of my invention is to provide a device of the above described character adaptable for use on each of the wheels of a motor vehicle whereby the tubes thereof are maintained in inflated condition.

A still further object of my invention is to provide a device of the above described character equipped with means for denoting the inflated condition of the tube at all times.

Another important object of my invention is to provide a tube inflating device equipped with means for automatically maintaining the tube inflated.

Still another object of my invention is to provide a device of the above described character which is simple in construction, durable in use, efficient in operation and adapted for attachment to motor vehicles already in use without substantially modifying the structure thereof.

Other objects and advantages will be apparent from the following description, appended claims and annexed drawings.

Referring to the drawings wherein like reference characters designate like parts throughout the several views:

Figure 2 is a longitudinal sectional view of my invention.

Figure 1:
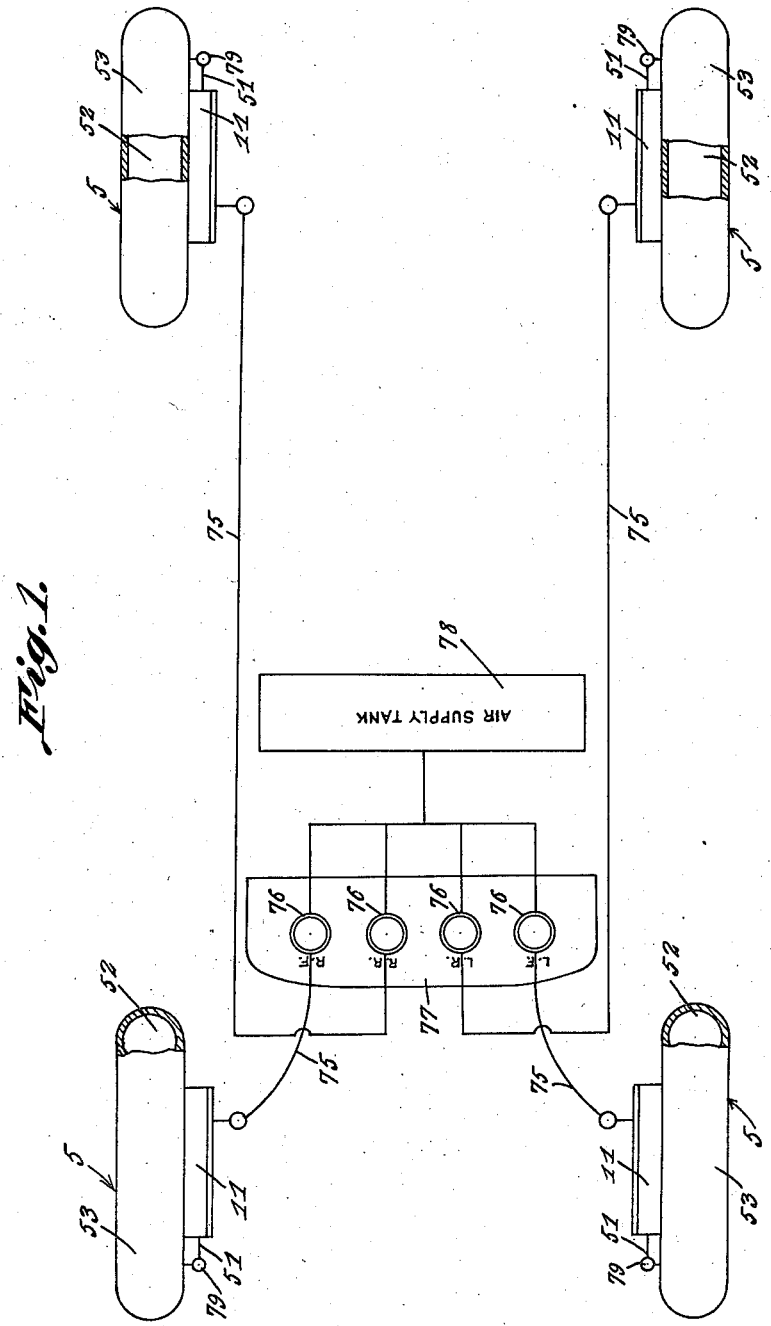
Figure 1 is a diagrammatic view illustrating my invention in connection with a motor vehicle structure.

Figures 3 and 4 are sectional views taken on the lines 3—3 and 4—4 of Figure 2 respectively.

Figure 5 is a detail top plan view of the actuating mechanism effecting connection between the motor vehicle wheel and my valve shifting mechanism.

In practicing my invention I provide a motor vehicle wheel 5 fashioned with a hub 6 rotatably mounted on an axle 7. Adjacent said hub 6 and embracing the axle 7 is a stationary brake drum 8 of ordinary construction provided with the usual outer face 9.

Fixed to the face 9 of the brake drum 8 by means of screws 10 is a housing 11 fashioned with a peripheral wall 12 and an inner end wall 13 abutting the face 9 of the brake drum. The housing is provided with an outer open end closed by a detachable plate 14 secured thereto by means of screws 15. Fixed to the hub 6 is a cylindrical shell 16 having a circumferentially extending air chamber 17. Said shell is fashioned with an outer peripheral wall 18 having a circumferentially extending projecting section 19 provided with arcuate shaped clutch faces 19a and 19b fashioned with circumferentially extending grooves 20 and 21 respectively, the groove 20 being disposed towards the outer end of said shell while the groove 21 is disposed towards the inner end thereof.

Located within the housing is a circumferentially extending band 22 embracing the section 19 and said band 22 is fashioned with right angularly disposed side flanges 23 fashioned with circumferentially extending grooves 24 for accommodating therein ball bearings 25 for a purpose hereinafter set forth. Said band 22 is of sectional construction and the sections are secured together by means of bolts 26.

Interposed between the outer peripheral face 18 of the shell 16 and the inner peripheral face of the band 22 is a pair of circumferentially extending outer and inner clutch elements 27 and 28 respectively which are fashioned on the outer side walls with circumferentially extending grooves 29 forming seats for the ball bearings 25 thereby providing a free running fit between the elements 27, 28 and flanges 23 of the band 22.

The clutch elements 27 and 28 are of a ring like configuration and formed with circumferentially extending chambers 30 and 31 respectively. The inner circumferential faces of the clutch elements 27 and 28 are of an arcuate configuration conforming to the clutch faces 19a and 19b respectively and are provided with a suitable gasket material 32 and 33 respectively for engagement with the respective clutch faces. The opposed side walls of the elements 27 and 28 are fashioned with circumferentially extending grooves forming a seat in which are seated ball bearings 34 serving to maintain the elements in spaced relation and providing for free relative movement therebetween.

The clutch elements 27 and 28 adjacent the shell 16 are each provided with a laterally extending offset section 35 and 36 respectively and which are formed with a passage communicating with the chambers 30 and 31 respectively. Secured within the sections 35 and 36 are the ends of spiral shaped springs 37 and 38 respectively. The opposite ends of said springs are connected to the peripheral wall 12 and said peripheral wall 12 is formed with an inwardly extending bore 39. The springs 37 and 38 are of a tube like construction to provide air passages extending therethrough communicating between the chambers 30 and 31 and bore 39 for a purpose hereinafter set forth.

The inner peripheral faces of the clutch elements 27 and 28 are fashioned with apertures 40 and 41 respectively communicating with the chambers 30 and 31. Said apertures are provided with valve seats for accommodating valves 42 and 43 equipped with valve stems 44 and 45 extending through the apertures 40 and 41 respectively. Said valves 42 and 43 are urged into seating engagement with the respective seats through the medium of springs 46 having their outer ends seated within recesses formed in screws 47 threaded in the outer peripheral faces of the elements 27 and 28. Adjustment of the screws 47 serves to vary the tension of the springs 46 and permit removal of the latter and replacement of the valves. When the valves are in seated or closed position the stems extend without the apertures 40 and 41 for engagement with the clutch faces 19a and 19b as hereinafter described. The apertures 40 and 41 are each provided with an enlarged section at the outer ends thereof for registry with the grooves 20 and 21 when the respective clutch elements engage the clutch faces 19a and 19b.

The outer peripheral wall 18 of the shell 16 is provided with openings in which are threaded valve members 48 and 49. Each of said valve members are provided with a check ball 50 operable for closing passages 48a and 49a connecting the grooves 20 and 21 respectively with the chamber 17.

Obviously, when the band 22 is moved in an axial direction towards the brake drum 8 the inner peripheral face of the clutch element 27 will engage the clutch face 19a causing the lower end of the stem 44 to engage the clutch face and operate the valve 42 to open position as illustrated in Figure 2. This operation causes the clutch element 28 to be moved in the same direction together with the element 27 thereby disengaging the end of the stem 45 of the valve 43 and causing the same to be actuated to a closed position. In this position of the parts air introduced into the bore 39 in a manner hereinafter set forth will be transmitted through the spring 29 into the chamber 30 whence the same will flow through the aperture 40 into the groove 20 and discharge therefrom into the chamber 17 through the passage and valve 48.

The valve 49 serves to prevent the escape of the air through the passage 49a into groove 21.

One side of the shell 16 has connected thereto a feed line 51 connected to an inner tube 52 of a tire casing 53 carried by the wheel 5 and thus air introduced into the chamber 17 in the manner heretofore set forth will be communicated to the tube 52 through the feed line 51, thereby equalizing the pressure in the tube relative to the chamber 17. Obviously, a reverse axial movement of the band 22 serves to close the valve 42 and open the valve 43, thereby permitting air to be introduced into the chamber 17 from the bore 39 through the medium of spring 38.

From the foregoing it will be apparent that when the clutch element 27 is in engagement with the clutch face 19a, the spring 37 is connected to the wall 12 at the outer end and to the section 35 at the opposite end and upon rotation of the wheel 5 on the axle 7 the spring will be subjected to a winding action. To prevent a too great a winding of the spring 37 it is necessary to shift the clutch elements 27 and 28 whereby to disengage the element 27 from the face 19a and permit engagement of the clutch element 28 with the face 19b to maintain a flow of air into the chamber 17 through the spring 38.

To accomplish this shifting of the clutch elements and prevent breakage of the springs I provide a yoke 53 fashioned with a pair of arms embracing the band 22 and connected thereto by means of screws 54 or the like. The connected ends of the arms of the yoke are fashioned with an upwardly extending lug 55 slidably mounted within a slot 56 fashioned in the wall 12 of the housing 11 as clearly illustrated in Figure 2. Mounted on the outer face of the wall 12 is a plate 57 fixed with an offset arm 58 spaced from the outer face of the wall 12. The arm 58 is provided with a shaft 59 on which is rotatably mounted a star wheel 60 having a plurality of teeth 61, for instance five in number, for engagement with a laterally extending lug 62 carried on the inner face of a disk 63 or spoke of the wheel.

Fashioned on the lower face of the star wheel 60 is a cam 64 for engaging a pair of spaced pins 65 mounted on a slide 66 interposed between the arm 58 and the wall 12. The arm 58 is fashioned with a pair of longitudinally extending slots in which the pins are adapted to be operated. The slide 66 is connected to the lug 55 of the yoke 53 by means of screws 67. Mounted on the plate 57 is a housing 68 in which is slidably mounted a finger 69 having a recessed end 70 for engagement with the end of the teeth 61 and said finger is normally urged towards the star wheel by means of a spring 71 positioned within said housing.

Upon rotation of the wheel 5 the lug 62 will engage one of the teeth 61 and rotate the star wheel a sufficient distance to position another tooth in the path of the lug upon the next rotation of the wheel. Continued rotation of the wheel serves to rotate the star wheel thereby causing the cam 64 to move the pins 65 and impart a reciprocating movement to the slide 66. The reciprocation of the slide 66 serves to impart a similar movement to the yoke 53 which in turn causes axial reciprocation of the band 22 to effect alternate engagement of the clutch elements 27 and 28 with the clutch faces 19a and 19b respectively. From the foregoing it will be apparent that alternate engagement of the clutch elements with the respective clutch faces serves to maintain a continuous flow of air into the chamber 17 through the respective springs and upon disengagement of one clutch element from its respective clutch face the spring attached thereto will unwind and reposition the clutch element for engagement with the respective clutch face upon the shifting of the band 22 as heretofore set forth.

As illustrated in Figure 1 of the drawings each wheel is equipped with a housing 11 and the bores 39 of said housings are connected by means of a pipe line 75 to respective gauges 76 mounted on a dashboard 77 of the motor vehicle. Each of the gauges are in turn connected by means of pipe lines to a supply tank 78 for supplying air to the respective chamber 17. The gauges 76 are so constructed and arranged to indicate the amount of air pressure within the respective chamber 17 thereby permitting the operator of a motor vehicle to be readily notified should one of the pipes 75 become ruptured or other of the parts disconnected or damaged. Likewise should one of the tubes 52 become blown, the respective gauge 76 connected thereto would indicate an excess amount of air being supplied thereto. Secured within the connection 51 is a check valve 79 operating to prevent air from the tube 52 being discharged within the chamber 17 should the springs 37 and 38 or other connected parts become ruptured.

From the foregoing it will be apparent that my invention provides means whereby air from a supply tank is in continuous communication with the tubes of motor vehicles during the operation of said vehicle. The air in the supply tank 78 is maintained at a desired pressure in any convenient manner, for instance by a pump or the like equipped with a pressure valve mechanism for actuating the same to maintain said pressure. Said pump and pressure valve mechanism being of ordinary construction.

What I claim is:

1. The combination of a motor vehicle wheel equipped with an inflatable tire tube and formed with a rotatable hub and a stationary brake drum; of a tire inflating device comprising a housing fixed to said drum and provided with an air receiving bore, a shell mounted on said hub and rotatable therewith, said shell equipped with oppositely disposed clutch faces having passages communicating with the interior of said shell, a band embracing said shell, clutch elements interposed between said band and said shell and fashioned with air chambers and for alternately engaging said clutch faces for communicating air from said chamber to said passages, tubular springs connected to said housing and said clutch elements respectively for effecting communication between said bore and said air chambers, a yoke carried by said band for shifting said band in a manner whereby said clutch elements alternately engage said clutch faces, an air line connecting said shell to said tube, means mounted on said housing for operating said yoke, and a member secured on said wheel for operating said means whereby said clutch elements are alternately shifted for maintaining a flow of air through said springs into said shell.

2. The elements of claim 1 as set forth and defined together with a check valve controlling said air line to permit the passage of air from said tube into said shell.

ANTON A. STARKE.